(12) United States Patent  
Yasukochi (10) Patent No.: US 9,776,344 B2  
(45) Date of Patent: Oct. 3, 2017

(54) STRUCTURE FORMING APPARATUS, METHOD OF MANUFACTURING A STRUCTURE, AND STRUCTURE

(75) Inventor: Hiroyuki Yasukochi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 328 days.

(21) Appl. No.: 13/608,696

(22) Filed: Sep. 10, 2012

(65) Prior Publication Data

US 2013/0071577 A1 Mar. 21, 2013

(30) Foreign Application Priority Data

Sep. 15, 2011 (JP) ................................. 2011-201503

(51) Int. Cl.
| | |
|---|---|
| *B05C 1/00* | (2006.01) |
| *B29C 39/14* | (2006.01) |
| *B33Y 10/00* | (2015.01) |
| *B33Y 30/00* | (2015.01) |

(52) U.S. Cl.
CPC ............. *B29C 39/148* (2013.01); *B33Y 10/00* (2014.12); *B33Y 30/00* (2014.12)

(58) Field of Classification Search
USPC ......................................................... 427/521
See application file for complete search history.

(56) References Cited

U.S. PATENT DOCUMENTS

| | | | | |
|---|---|---|---|---|
| 5,424,813 | A  * | 6/1995 | Schlueter et al. ............ | 399/239 |
| 2007/0196578 | A1* | 8/2007 | Karp et al. ..................... | 427/331 |
| 2010/0141720 | A1* | 6/2010 | Ready et al. ................... | 347/88 |
| 2011/0127697 | A1* | 6/2011 | Milne .......................... | 264/400 |

FOREIGN PATENT DOCUMENTS

JP          2007-090859          4/2007

* cited by examiner

*Primary Examiner* — Robert S Walters, Jr.
(74) *Attorney, Agent, or Firm* — Chip Law Group (57) ABSTRACT

Provided is a structure forming apparatus, including: a roller provided to be rotatable, having a length in an axial direction of the rotation, and capable of transmitting an energy beam; a retaining member arranged to face the roller such that a slit region having a length in the axial direction is formed between the retaining member and the roller, and capable of retaining a material to be cured by energy of the energy beam at least in the slit region; an irradiation unit configured to selectively radiate the energy beam to the slit region through the roller to cure the material so that a sheet-like structure is formed; and a take-up reel configured to take up the sheet-like structure thus formed.

17 Claims, 11 Drawing Sheets

STRUCTURE FORMING APPARATUS, METHOD OF MANUFACTURING A STRUCTURE, AND STRUCTURE

CROSS REFERENCES TO RELATED APPLICATIONS

The present application claims priority to Japanese Priority Patent Application JP 2011-201503 filed in the Japan Patent Office on Sep. 15, 2011, the entire content of which is hereby incorporated by reference.

BACKGROUND

The present application relates to a structure formed by curing a material through irradiation with an energy beam, a structure forming apparatus, and a method of manufacturing a structure.

In the optical-film manufacturing method disclosed in Japanese Patent Application Laid-open No. 2007-90859 (hereinafter, referred to as Patent Document 1), a film made of a polycarbonate resin, which has been extruded in a film-like shape and in a molten state from a die mounted to an extruding machine, is inserted to be sandwiched between a forming roll having a surface provided with an engraved pattern and an elastic roll. In this way, the engraved pattern on the surface of the forming roll is transferred onto the film (refer, for example, to paragraph [0033] of the specification of Patent Document 1).

SUMMARY

In the film manufacturing method using such a forming roll, the engraved pattern of the forming roll is transferred onto the film. In such a method, the shape transferred onto the film is limited in fineness and accuracy.

In view of the above-mentioned circumstances, there is a need to provide a structure forming apparatus capable of forming a sheet-like structure having a minute and highly accurate shape, a method of manufacturing a structure, and a structure.

According to an embodiment of the present application, there is provided a structure forming apparatus including a roller, a retaining member, an irradiation unit, and a take-up reel.

The roller is provided to be rotatable, has a length in an axial direction of the rotation, and is capable of transmitting an energy beam.

The retaining member is arranged to face the roller such that a slit region having a length in the axial direction is formed between the retaining member and the roller, and is capable of retaining a material to be cured by energy of the energy beam at least in the slit region.

The irradiation unit is configured to selectively radiate the energy beam to the slit region through the roller to cure the material so that a sheet-like structure is formed.

The take-up reel is configured to take up the sheet-like structure thus formed.

According to the embodiment of the present application, the roller and the take-up reel are rotated under a state in which the material is retained in the slit region formed between the roller and the retaining member, and the energy beam is radiated to the slit region. In this way, the sheet-like structure is formed and delivered. In other words, unlike related art, this structure forming apparatus forms the sheet-like structure not by a method using a forming roll but by a modeling technique using rapid prototyping. Thus, the sheet-like structure can be formed in a minute and highly accurate shape.

The structure forming apparatus may further include a supply reel configured to supply a base film to between the roller and the retaining member. With this, the sheet-like structure can be formed on the base film.

The take-up reel may take up the sheet-like structure formed on the base film together with the base film. With this, a roll of the base film and the sheet-like structure adhering thereto can be formed.

The irradiation unit may include a first light source configured to generate a laser beam as the energy beam. With this, the sheet-like structure can be formed by a stereolithographic technique in the field of rapid prototyping.

The irradiation unit may further include a scanning mechanism configured to scan the laser beam generated from the first light source in the axial direction.

The retaining member may be made of a material capable of transmitting the laser beam. Further, the irradiation unit may further include a second light source configured to irradiate the material retained in the slit region by the retaining member with a laser beam. With this, it is possible to form a structure formed of a first cured layer obtained by irradiation of the material with the laser beam from the first light source and a second cured layer obtained by irradiation of the material with the laser beam from the second light source. Thus, the sheet-like structure can be formed in a complicated shape.

The material may include a photo-curable resin and contain a light absorber. In this case, the irradiation unit may further include a control unit configured to control power of the laser beam from the first light source so that a depth of the sheet-like structure formed in the slit region is successively controlled in an optical axis direction of the laser beam from the first light source. Also with this, the sheet-like structure can be formed in a complicated shape.

The structure forming apparatus may further include a supply mechanism configured to supply the material to the slit region. When the material is supplied with the supply mechanism to the slit region, the material can be automatically supplied.

The structure forming apparatus may further include a removal unit configured to remove an uncured material adhering to the sheet-like structure output from the slit region. With this, the take-up reel can take up and store the sheet-like structure in a pure state free from the uncured material.

The removal unit may include a nozzle configured to suck the uncured material by a vacuum action.

The removal unit may further include a pipe-shaped mesh roller which is formed of a mesh member, provided to be rotatable on a transfer path for the sheet-like structure between the roller and the take-up reel, and applies tension to the sheet-like structure output from the slit region. Further, the nozzle may be arranged inside the pipe-shaped mesh roller, and suck the uncured material through intermediation of the mesh member of the pipe-shaped mesh roller. With this, while the structure is transferred by the pipe-shaped mesh roller, the uncured material can be removed by being sucked with the nozzle through intermediation of the pipe-shaped mesh roller. Further, the nozzle is arranged inside the pipe-shaped mesh roller, and hence a space for the removal unit can be saved.

The retaining member may be made of a material capable of transmitting the laser beam from the first light source. In this case, the structure forming apparatus may further include a removal unit, and a transfer mechanism.

The removal unit is configured to remove an uncured material adhering to the sheet-like structure output from the slit region. The transfer mechanism is configured to transfer the sheet-like structure from which the uncured material has been removed by the removal unit up to the take-up reel while the laser beam emitted from the first light source through the retaining member is input to the sheet-like structure from which the uncured material has been removed.

With this, with use of the energy of the laser beam that has been emitted through the roller and transmitted through the slit region and the retaining member, post-curing treatment on the sheet-like structure from which the uncured material has been removed can be performed.

The structure forming apparatus may further include one of a reflecting member and a light guide member configured to support input of the laser beam from the first light source to the sheet-like structure to be transferred by the transfer mechanism. With this, the energy of the laser beam to form the sheet-like structure can be used with higher efficiency.

A method of manufacturing a structure according to another embodiment of the present application includes retaining a material to be cured by energy of an energy beam in a slit region which is formed between a roller provided to be rotatable, having a length in an axial direction of the rotation, and capable of transmitting the energy beam, and a retaining member arranged to face the roller, and which has a length in the axial direction.

Through selective radiation of the energy beam to the slit region through the roller to cure the material, a sheet-like structure is formed.

The sheet-like structure thus formed is taken up with a take-up reel.

A structure according to still another embodiment of the present application is a structure manufactured by the above-mentioned manufacturing method.

As described above, according to the embodiments of the present application, a sheet-like structure having a minute and highly accurate shape can be formed.

These and other objects, features and advantages of the present disclosure will become more apparent in light of the following detailed description of best mode embodiments thereof, as illustrated in the accompanying drawings.

Additional features and advantages are described herein, and will be apparent from the following Detailed Description and the figures.

DETAILED DESCRIPTION

Hereinafter, embodiments of the present application will be described with reference to the drawings.

First Embodiment (Structure of Structure Forming Apparatus)

Figure 1:
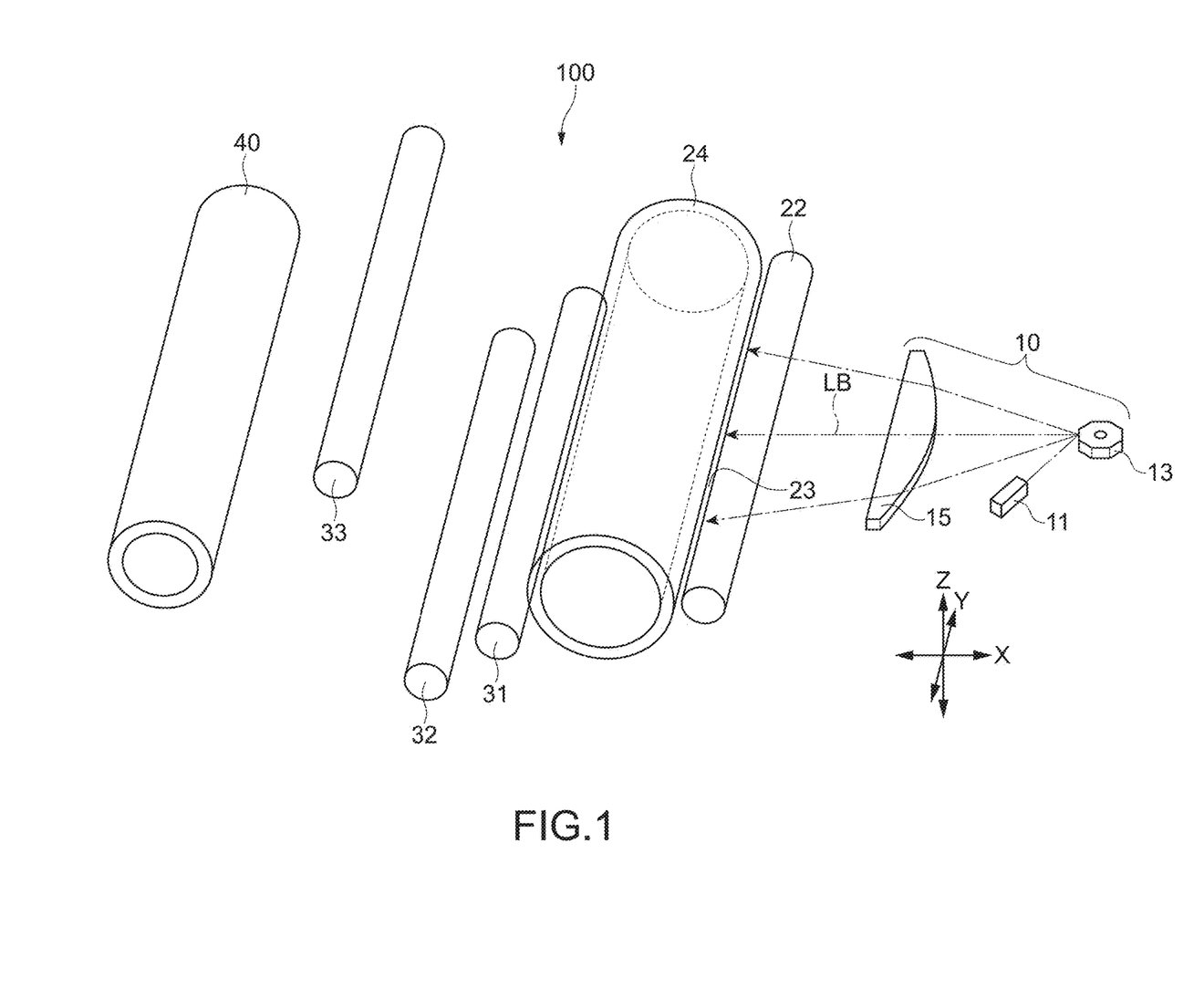
FIG. 1 is a schematic view of a structure of a structure forming apparatus according to a first embodiment of the present application.
Figure 2:
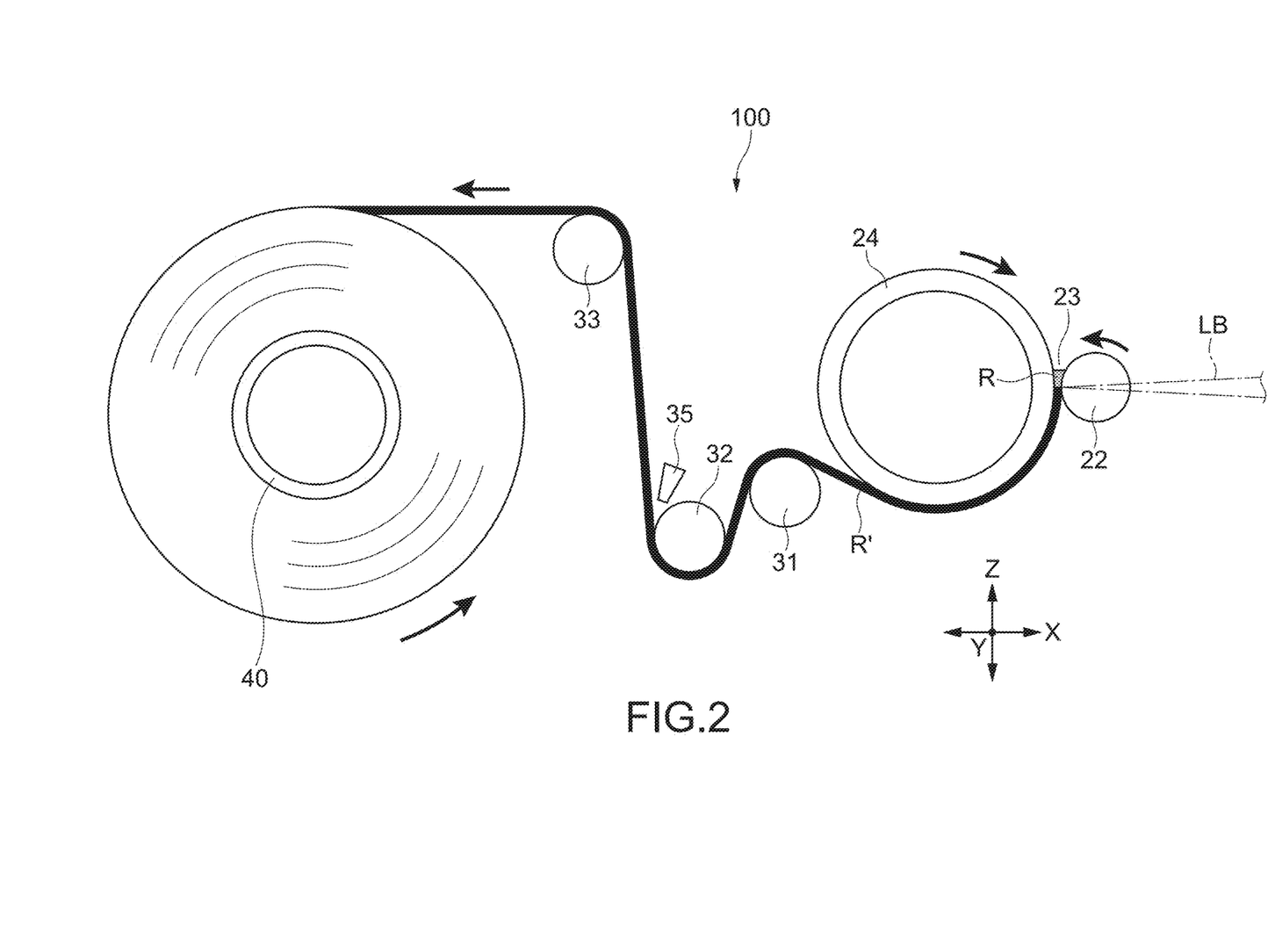
FIG. 2 is a side view of the structure forming apparatus illustrated in FIG. 1.

FIG. 1 is a schematic view of a structure of a structure forming apparatus according to a first embodiment of the present application. FIG. 2 is a side view of the structure forming apparatus 100 illustrated in FIG. 1.

The structure forming apparatus 100 includes an irradiation unit 10 configured to irradiate energy beams as laser beams LB, a roller 22 to which the laser beams LB are input, and a pipe member 24 arranged to face the roller 22. Further, the structure forming apparatus 100 includes a take-up reel 40, a plurality of tension rollers 31, 32, and 33 arranged between the pipe member 24 and the take-up reel 40, and a washing nozzle 35 (refer to FIG. 2) arranged near the tension roller 32 among these tension rollers 31, 32, and 33.

The irradiation unit 10 has a laser light source 11 configured to generate the laser beams LB, a polygonal mirror 13 configured to reflect the laser beams generated from the laser light source 11, and an fθ lens 15 configured to convert an equiangular motion of each of the laser beams reflected by the polygonal mirror 13 into a uniform motion and emit the laser beams thus converted. The polygonal mirror 13 is rotated about a rotation axis along, for example, a vertical direction (Z-axis direction) in FIG. 1 so as to scan the laser beams LB along a longitudinal direction of the roller 22 (Y-axis direction). In this case, at least the polygonal mirror 13 functions as a scanning mechanism. A galvanometer mirror may be provided instead of the polygonal mirror 13.

The roller 22 is driven to be rotated by a motor connected thereto (not shown). The roller 22 has a length along the axial direction of rotation thereof (Y-axis direction). The roller 22 has a substantially solid columnar shape. At least a part of the roller 22, which transmits the laser beams LB, is made of a transparent material such as glass or acrylic. The pipe member 24, the tension rollers 31, 32, and 33, and the take-up reel 40 are each provided to be rotatable about a rotation axis along a direction similar to that of the roller 22.

The pipe member 24 is arranged to face the roller 22 such that a clearance 23 is formed between the roller 22 and the pipe member 24. The pipe member 24 is formed to have a diameter larger than a diameter of the roller 22. In the clearance 23 between the roller 22 and the pipe member 24, a liquid material R curable by the laser beams LB is retained. The material R is retained by its surface tension in the clearance 23. The pipe member 24 functions as a retaining member configured to retain the material R between the pipe member 24 and the roller 22.

As the material R, there is used a resin material to be cured by the laser beams LB. When ultraviolet rays are used as the laser beams LB, an ultraviolet-curable resin is used as the material R. The laser beams LB may include infrared rays and visible light, and in accordance therewith, the resin material can be appropriately selected.

In the clearance 23, there is formed a (one-dimensional) slit region having a length along the same as those of the rotation axes of the roller 22 and the pipe member 24. In other words, the slit region corresponds to a region including a narrowest region within a width of the clearance 23 (width in an optical axis direction of the laser beams (X-axis direction in an example in FIG. 2)). The roller 22 and the pipe member 24 are positioned and a laser optical system is configured such that, in the slit region, the laser beams LB are input from the roller 22 side.

Note that, the irradiation unit 10 may include an optical system configured to focus the laser beams LB. In this case, the optical system is designed to focus the laser beams LB within the slit region.

The roller 22 and the pipe member 24 are arranged relative to each other such that the width in the X-axis direction of the slit region is set to approximately 1 mm or 1 mm or less. These typical values depend on a type of the material R, an accuracy of a structure to be formed, and the like. A depth in the Z-axis direction of the material R retained in the clearance 23 depends on materials for the roller 22 and the pipe member 24, the type of the material R, the width in the X-axis direction of the clearance 23, and the like.

The entire or a part of the pipe member 24 may be made, for example, of a transparent material such as glass or acrylic similar to the above-mentioned roller 22, or may be made of a material that does not transmit the laser beams LB.

As illustrated in FIG. 2, the laser beams LB emitted through the fθ lens 15 enter typically from a side of the roller 22 in a substantially horizontal direction, and then enter the slit region via an optical path in the roller 22, a length of which corresponds to the diameter of the roller 22.

The take-up reel 40 is driven to be rotated by a motor connected thereto (not shown), and as described below, takes up a cured object R' (structure) (indicated by the solid bold line in FIG. 2) which is a material cured in the slit region by irradiation with the laser beams LB.

The tension rollers 31, 32, and 33 form a transfer path along which the cured object R' output from the slit region is transferred up to the take-up reel 40. The tension rollers 31, 32, and 33 are rotated by a transfer force of the cured object R', which is generated by appropriate tension applied to the cured object R'. A motor may be connected to at least one of the tension rollers 31, 32, and 33.

It is not necessary that the roller 22 and the take-up reel 40 be respectively driven by separate motors. In other words, the roller 22 and the take-up reel 40 may be driven by one motor through intermediation of a transmission mechanism or the like. Alternatively, at least one the tension rollers 31, 32, and 33 may be driven to be rotated by a motor connected thereto.

The washing nozzle 35 jets washing liquid containing ethanol, methanol, and the like. In this way, for example, the uncured material R adhering to the cured object R' is removed. Arrangement of the washing nozzle 35 can be appropriately changed. The washing nozzle 35 functions as a removal unit configured to remove the uncured material R.

(Operation of Structure Forming Apparatus)

Description is made of the structure forming apparatus 100 structured as described above.

The material R is supplied from a material supply unit (supply mechanism) (not shown) to the clearance 23 between the roller 22 and the pipe member 24. A supply amount or a supply flow rate of the material from the material supply unit is appropriately set in accordance with the type of the material R, a capacity of the clearance 23, a transfer speed of the cured object R' (for example, rotational speed of the roller 22), and the like.

The roller 22 and the take-up reel 40 are rotated in synchronism with each other at constant speeds. Under a state in which the polygonal mirror 13 is rotated at a constant speed by, for example, a motor, the laser beams LB are emitted from the laser light source 11. Further, when a laser driver (not shown) outputs a modulation drive signal to the laser light source 11, ON/OFF of laser power thereof is controlled.

The laser driver is connected to a computer (not shown) storing three-dimensional data of a sheet-like structure to be formed. Based on the three-dimensional data, the computer outputs a control signal to the laser driver. In response thereto, the laser driver outputs the modulation drive signal to the laser light source 11.

In this way, in the slit region, the sheet-like cured object R' is formed in any shape. The cured object R' thus formed is output from the slit region by the pipe member 24 rotated by being dragged by rotational motive power of the roller 22 and the rotation of the roller 22, and by rotational motive power of the take-up reel 40. The cured object R' as a structure is taken up by the take-up reel 40 via the transfer path formed of the tension rollers 31, 32, and 33.

As described above, unlike related art, the structure forming apparatus 100 according to this embodiment forms a sheet-like structure not by a method using a forming roll but by a modeling technique using rapid prototyping. Thus, the sheet-like structure can be formed in a minute and highly accurate shape.

Further, the structure thus formed is stored by being taken up, and hence structures can be produced in large numbers and at high speed. As a result, cost reduction can be achieved.

Still further, in this embodiment, the material R retained in the one-dimensional (direction of the rotation axes of the roller 22 and the pipe member 24) slit region is irradiated with the laser beams LB. Thus, a technique of forming a structure by a one-dimensional regulated liquid surface method can be achieved. In order to achieve such a one-dimensional regulated liquid surface method, in this embodiment, the one-dimensional narrow slit region is formed by the roller 22 and the circular pipe member 24. With this, the cured object R' formed in the slit region is effectively peeled off from respective surfaces of the roller 22 and the pipe member 24.

In this embodiment, the washing nozzle 35 is provided. Thus, the take-up reel 40 can take up and store the structure in a pure state free from the uncured material R.

Second Embodiment

Figure 3:
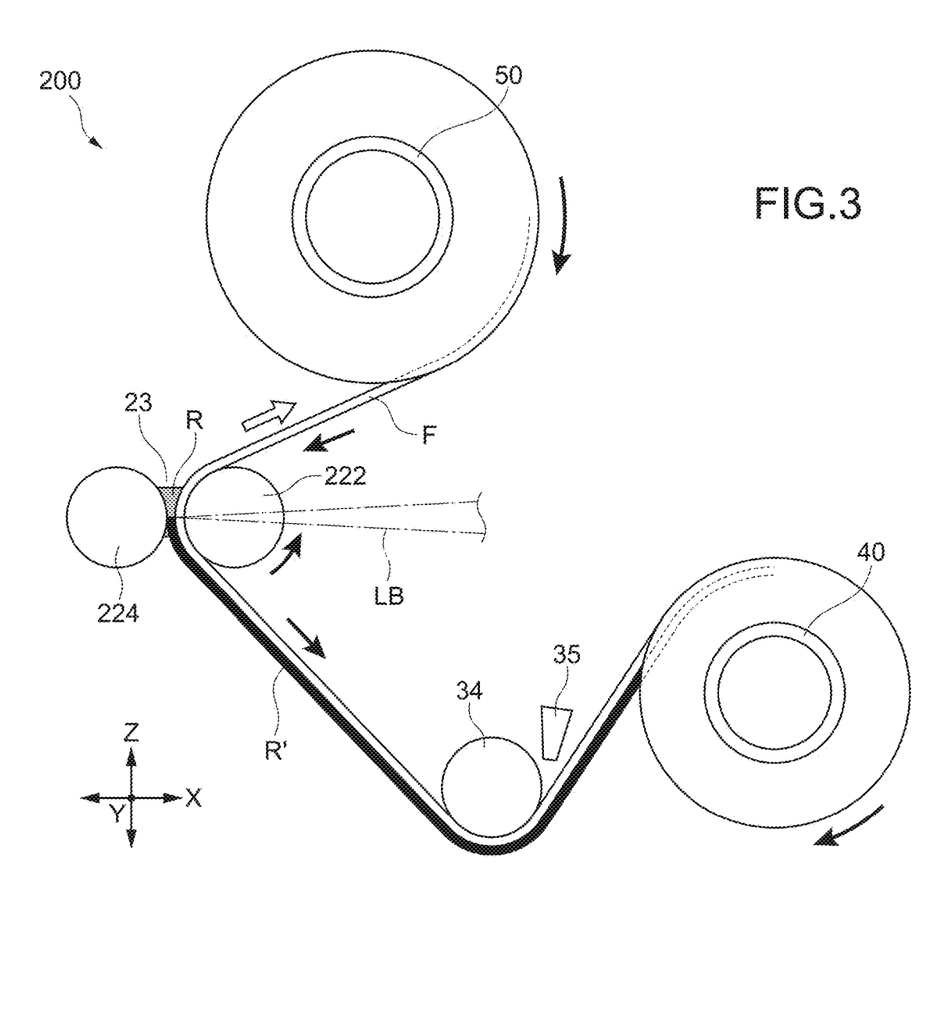
FIG. 3 is a schematic view of a structure forming apparatus according to a second embodiment of the present application.

FIG. 3 is a schematic view of a structure forming apparatus according to a second embodiment of the present application. In the description hereinbelow, description of the same members, functions, and the like as those of the structure forming apparatus 100 according to the embodiment described with reference, for example, to FIG. 1 is simplified or omitted, and description is made mainly of differences.

The structure forming apparatus 200 includes a pair of rollers 222 and 224 between which the clearance 23 for retaining a material is secured, and a supply reel 50 configured to supply a base film F to the clearance 23.

The supply reel 50 may be driven to be rotated, or may be driven by a rotational driving force of the take-up reel 40. As the base film F, there is used PET (Polyethylene terephthalate), PVA (Polyvinyl alcohol), or the like. As indicated by a hollow arrow in FIG. 3, the supply reel 50 applies back tension to the base film F.

The rollers 222 and 224 have substantially the same size. At least one of the rollers 222 and 224 has a part to transmit the laser beams LB. With this, the laser beams LB are input to the slit region in the clearance 23 between the rollers 222 and 224 in pairs. Note that, in the example illustrated in FIG. 3, although being input to the roller 222 from the right side, the laser beams LB may be input to the slit region by being input from and transmitted through the roller 224 on the left side.

At least one of the rollers 222 and 224 in pairs may be driven to be rotated, or may be driven by the rotational driving force of the take-up reel 40.

The take-up reel 40 takes up not only a structure (cured object R') formed on the base film F but also the base film F itself.

In this embodiment, one tension roller 34 is provided between the pair of rollers 222 and 224 and the take-up reel 40. With this, a transfer path for the structure is formed between the rollers 222 and 224 and the take-up reel 40. The washing nozzle 35 is arranged near the tension roller 34.

According to the structure forming apparatus 200 as described above, the structure can be formed on the base film F, and the base film F can function as a carrier.

Third Embodiment

Figure 4:
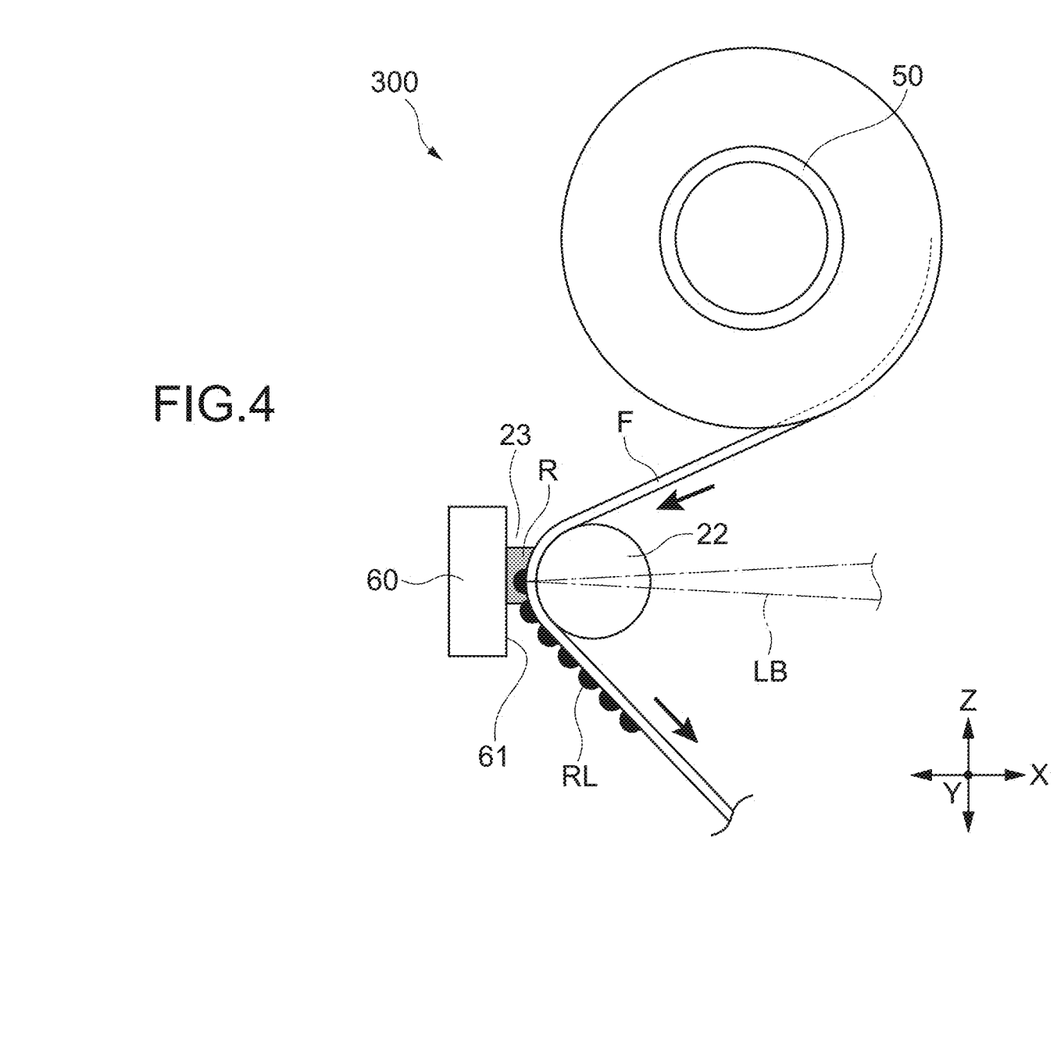
FIG. 4 is a schematic view of a structure forming apparatus according to a third embodiment of the present application.

FIG. 4 is a schematic view of a structure forming apparatus according to a third embodiment of the present application.

The structure forming apparatus 300 according to this embodiment includes a non-rotating retaining member 60 instead of the pipe member 24 and the like in the first embodiment. In this case, the material R is retained in the clearance 23 between the roller 22 and the retaining member 60, and the slit region is formed in the clearance 23. The retaining member 60 has a retaining surface 61 for the material R, which is a surface facing at least the roller 22 and is formed in a substantially flat shape. Further, also in this embodiment, the supply reel 50 configured to supply the base film F is provided.

In addition, in this embodiment, when the resin material R contains a light absorber, the structure forming apparatus 300 is configured to be capable of performing gray scale exposure (gray tone exposure). Specifically, when the laser driver variably controls the laser power of the laser light source 11, a depth of a structure formed in the slit region can be successively controlled in the optical axis direction of the laser beams LB. In other words, as illustrated in FIG. 4, the structure forming apparatus 300 is capable of forming, on the base film F, a shape as that of a lens array RL having a thickness which successively varies correspondingly to regions of a sheet-like structure. In this case, the laser driver functions as a control unit.

When the lens array RL as illustrated in FIG. 4 is formed, the material R can be cured to a deeper side in proportion to magnitude of the laser power. Thus, it suffices that the laser power is smoothly controlled to be low, high, and low again during formation of each lens.

As the light absorption agent, there are used all kinds of well-known materials. For example, as an ultraviolet absorber, it is suitable to use benzophenone, benzotriazole, and the like.

In this embodiment, although being formed as a flat surface, the retaining surface 61 of the retaining member 60 may be formed as a curved surface. In this case, the retaining member 60 may be provided with a curved surface having a curvature in the same direction as that of a curvature of a surface of the roller 22. In other words, a concave surface may be formed as the surface of the retaining member 60.

Fourth Embodiment

Figure 5:
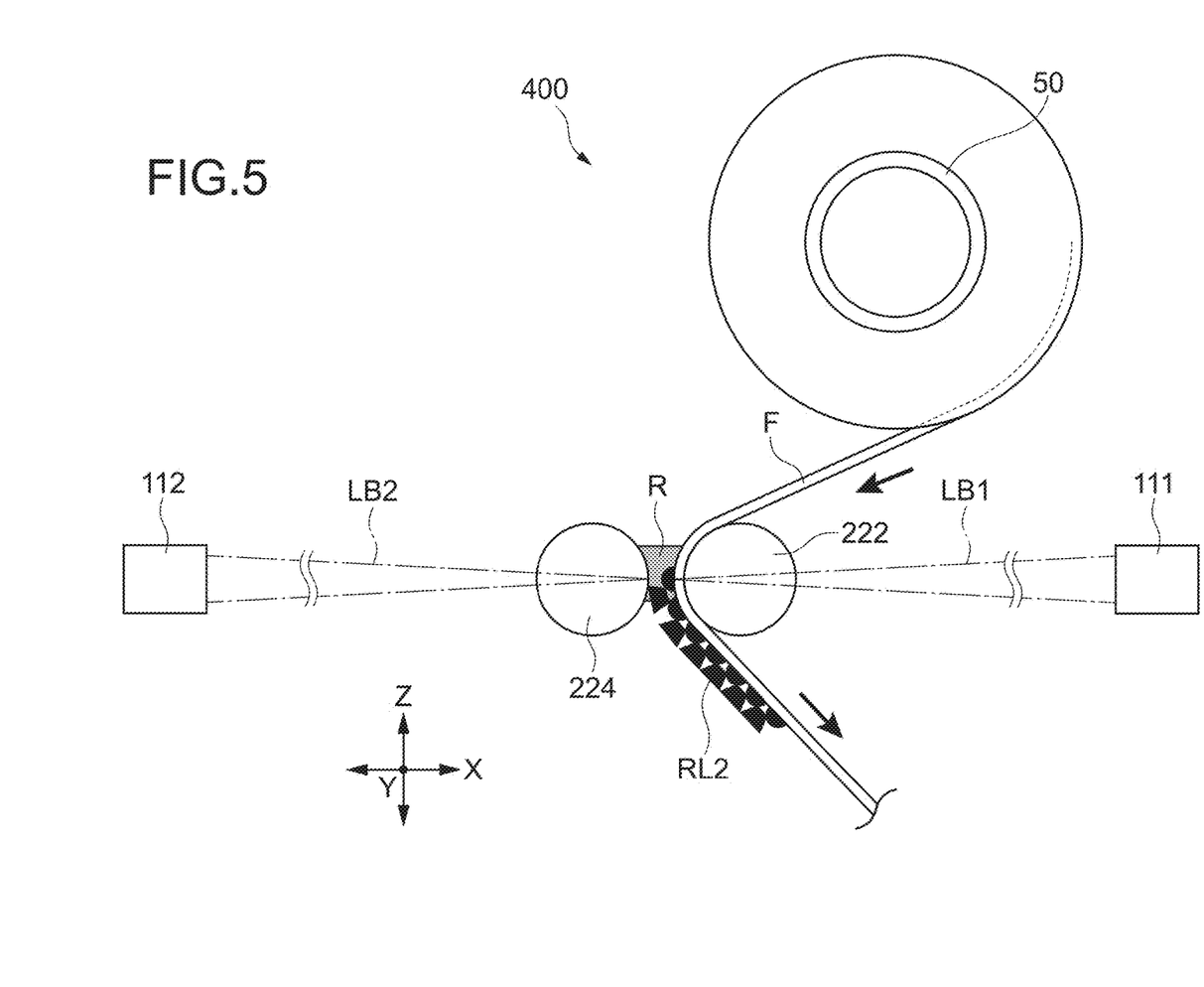
FIG. 5 is a schematic view of a structure forming apparatus according to a fourth embodiment of the present application.

FIG. 5 is a schematic view of a structure forming apparatus according to a fourth embodiment of the present application.

The structure forming apparatus 400 according to this embodiment includes the pair of rollers 222 and 224 configured to retain the material R, a first laser light source 111, and a second laser light source 112. Further, the structure forming apparatus 400 also includes the supply reel 50 configured to supply the base film F.

A laser beam LB1 from the first laser light source 111 is radiated from the roller 222 side, and a laser beam LB2 from the second laser light source 112 is radiated from the roller 224 side. Although being substantially parallel to each other, optical axes of the laser beams LB1 and LB2 may be non-parallel to each other.

According to the structure described above, it is possible to form a double-layer structure formed of a cured layer obtained by irradiation of the material with the laser beam LB1 from the first laser light source 111 and a cured layer obtained by irradiation of the material with the laser beam LB2 from the second laser light source 112. With this, the structure can be formed in a complicated shape. Note that, in FIG. 5, although a double-layer lens array R2 is formed, the structure may be formed in any shape.

Fifth Embodiment

Figure 6:
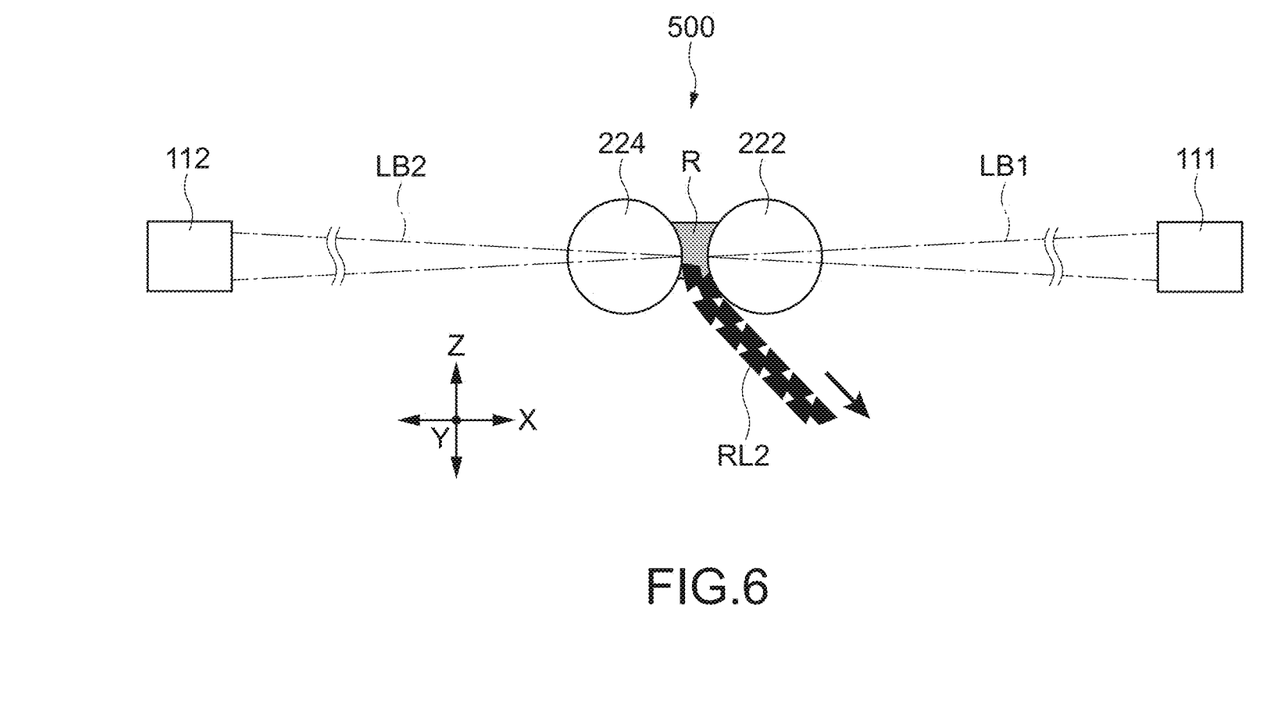
FIG. 6 is a schematic view of a structure forming apparatus according to a fifth embodiment of the present application.

FIG. 6 is a schematic view of a structure forming apparatus according to a fifth embodiment of the present application. The structure forming apparatus 500 according to this embodiment is different from the structure forming apparatus 400 illustrated in FIG. 5 in that the base film F is not supplied.

Sixth Embodiment

A structure forming apparatus according to a six embodiment of the present application (not shown) is different from the structure forming apparatuses according to the embodiments described with reference, for example, to FIGS. 1, 3, and 4 in that the structure taken up by the take-up reel 40 can be rolled back such that a second cured layer can be formed on a first cured layer that has been already formed (or on a surface on an opposite side of the base film F with respect to a side on which the first cured layer has been formed). In order to form the second cured layer, in this case, it suffices that the take-up reel 40 is set such that a direction of the take-up reel 40 is reversed (reversed in the axial direction) to a direction during formation of the first cured layer.

Seventh Embodiment

Figure 7:
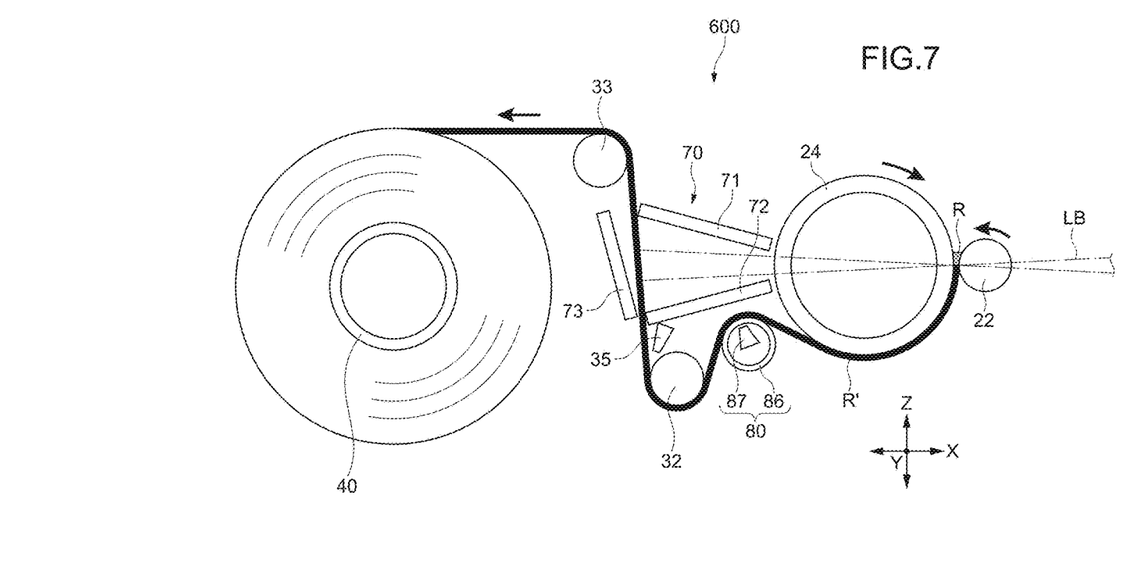
FIG. 7 is a schematic view of a structure forming apparatus according to a seventh embodiment of the present application.

FIG. 7 is a schematic view of a structure forming apparatus according to a seventh embodiment of the present application.

The structure forming apparatus 600 according to this embodiment is different from the structure forming apparatus 100 illustrated in FIG. 2 in that a mesh roller 86 is provided instead of the tension roller 31 in FIG. 2 and that a reflection mechanism 70 for the laser beam LB is additionally provided.

The entire or a part of the mesh roller 86 is formed of a mesh member, and hence is provided with a large number of pores. Further, the mesh roller 86 is formed in a pipe shape so as to be rotatable, and functions as the tension roller. In the inside of the mesh roller 86, there is arranged a vacuum nozzle 87 configured to suck the uncured material R adhering to a structure through intermediation of the mesh member of the mesh roller 86 by a vacuum action.

According to this embodiment, while the cured object R' (structure) is transferred by the mesh roller 86, the uncured material R adhering to the cured object R' can be removed with the nozzle through intermediation of the mesh roller 86. Further, the vacuum nozzle 87 is arranged inside the mesh roller 86, and hence a space for a removal unit 80 including the vacuum nozzle 87 and the mesh roller 86 can be saved.

In this embodiment, there may be provided a moving mechanism configured to move the vacuum nozzle 87 along an axial direction of the mesh roller 86 (Y-axis direction). The vacuum nozzle may include a plurality of vacuum nozzles. Alternatively, one or a plurality of nozzle units each formed of a plurality of nozzles integrated with each other may be provided in the mesh roller 86. Note that, the washing nozzle 35 may be omitted.

The pipe member 24 is made of a transparent material such as glass or acrylic, which transmits the laser beam LB that has been radiated to the slit region. A transfer mechanism, which is formed of the tension rollers 32 and 33 for transferring a structure, transfers a structure from which the uncured material R has been removed by the removal unit 80 and the like via a position at which the laser beam emitted through the pipe member 24 can be input to the structure. With this, with use of energy of the laser beam that has been transmitted through the slit region and the pipe member 24, post-curing treatment on the structure from which the uncured material has been removed can be performed.

The reflection mechanism 70 has a function to support input of the laser beam to the structure to be transferred by the tension rollers 32 and 33. The reflection mechanism 70 includes, for example, three reflecting plates (reflecting members) 71, 72, and 73, and these three reflecting plates 71, 72, and 73 are provided to surround the laser beam emitted through the pipe member 24. Two reflecting plates 71 and 72 are arranged between the pipe member 24 and the structure transferred by the transfer mechanism (32 and 33), and the rest one reflecting plate 73 is arranged behind the structure transferred by the transfer mechanism (32 and 33). The reflection mechanism 70 may have a box shape.

The laser beam emitted through the pipe member 24 is first reflected by the reflecting plate 73. A part of the laser beam reflected by the reflecting plate 73 enters the structure, and other parts of the laser beam are reflected several times between the two reflecting plates 71 and 72, and reenter the structure. In this way, the energy of the laser beam to form the structure can be used with higher efficiency.

Light guide members (referring to members that allow light to pass therethrough) may be provided instead of the reflecting plates 71, 72, and 73.

(Examples of Structure)

Example 1

Figure 8:
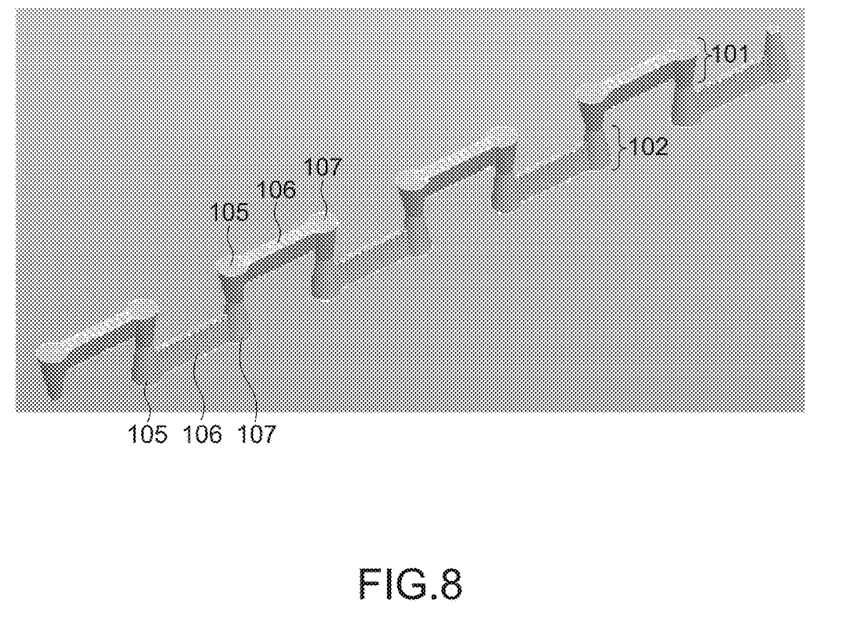
FIG. 8 is a perspective view illustrating an example of a structure having a double-layer structure, which is formed, for example, with the structure forming apparatus illustrated in FIG. 5 or 6.

FIG. 8 is a perspective view illustrating an example of a structure having a double-layer structure, which is formed, for example, with the structure forming apparatus 400 or 500 illustrated in FIG. 5 or 6.

This structure is formed by gray scale exposure, and has a vertically symmetrical shape and a double-layer structure formed of upper layer portions 101 and lower layer portions 102. One unit (one cell) of the structure includes two conical portions 105 and 107 and a bridge portion 106 bridged therebetween. The conical portion 105 of the upper layer portion 101 and the conical portion 107 of the lower layer portion 102 are coupled to each other. This structure has a size of being formed by a single scan by the laser beam along the Y-axis direction (refer to FIG. 2, for example).

Example 2

Figure 9:
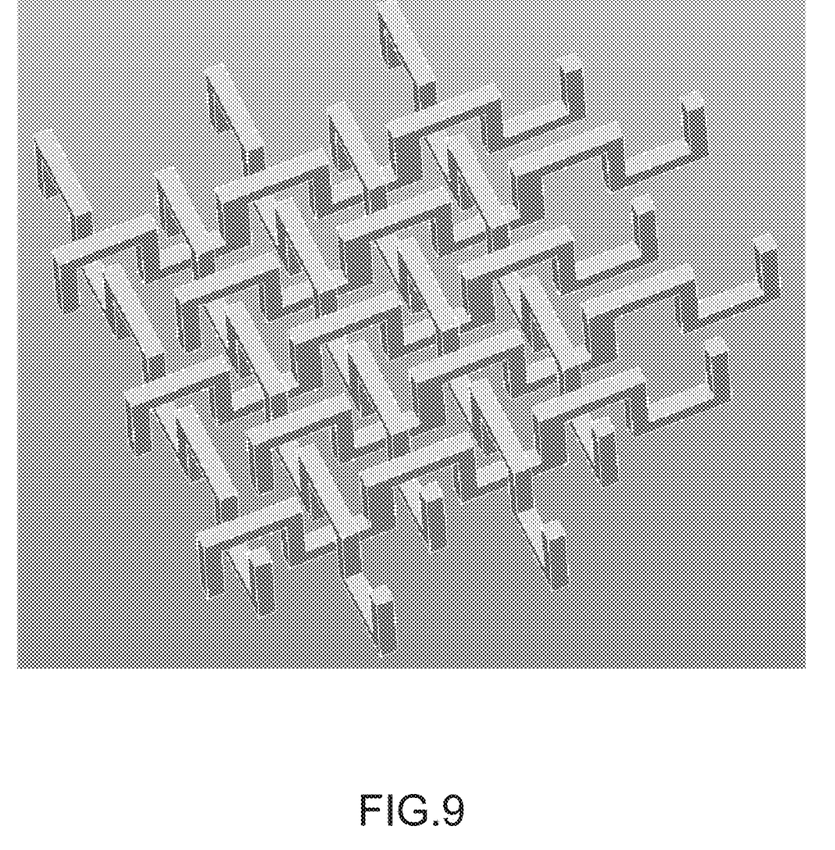
FIG. 9 illustrates a sheet-like structure having a pattern in which structures the same as that illustrated in FIG. 8, which is elongated in one direction, are arranged vertically and horizontally.

FIG. 9 illustrates a sheet-like structure having a fabric pattern in which structures the same as that illustrated in FIG. 8, which is elongated in one direction, are arranged vertically and horizontally. Note that, in FIG. 9, shapes of the conical portion 105 and the like in one cell of the structure illustrated in FIG. 8 are each simplified as a square columnar shape.

The structure forming apparatuses 400 and 500 illustrated in FIGS. 5 and 6 are capable of forming such a sheet-like structure having a complicated shape successively in large numbers and at high speed.

Example 3

Figure 10:
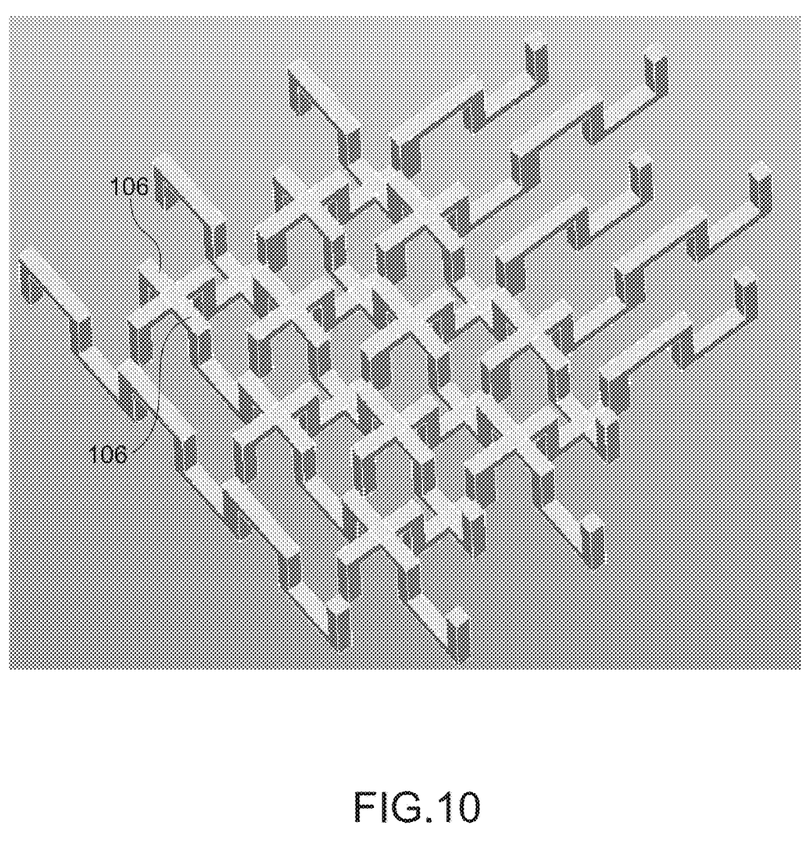
FIG. 10 is a perspective view of a structure according to another example, which can be formed with the structure forming apparatus.

FIG. 10 is a perspective view of a structure according to another example, which can be formed with the structure forming apparatuses 400 and 500. This structure is similar to the structure illustrated in FIG. 9, while different from the structure illustrated in FIG. 9 in that the structures in the vertical direction and the structures in the horizontal direction are continuous with each other at their bridge portions 106.

Example 4

Figure 11:
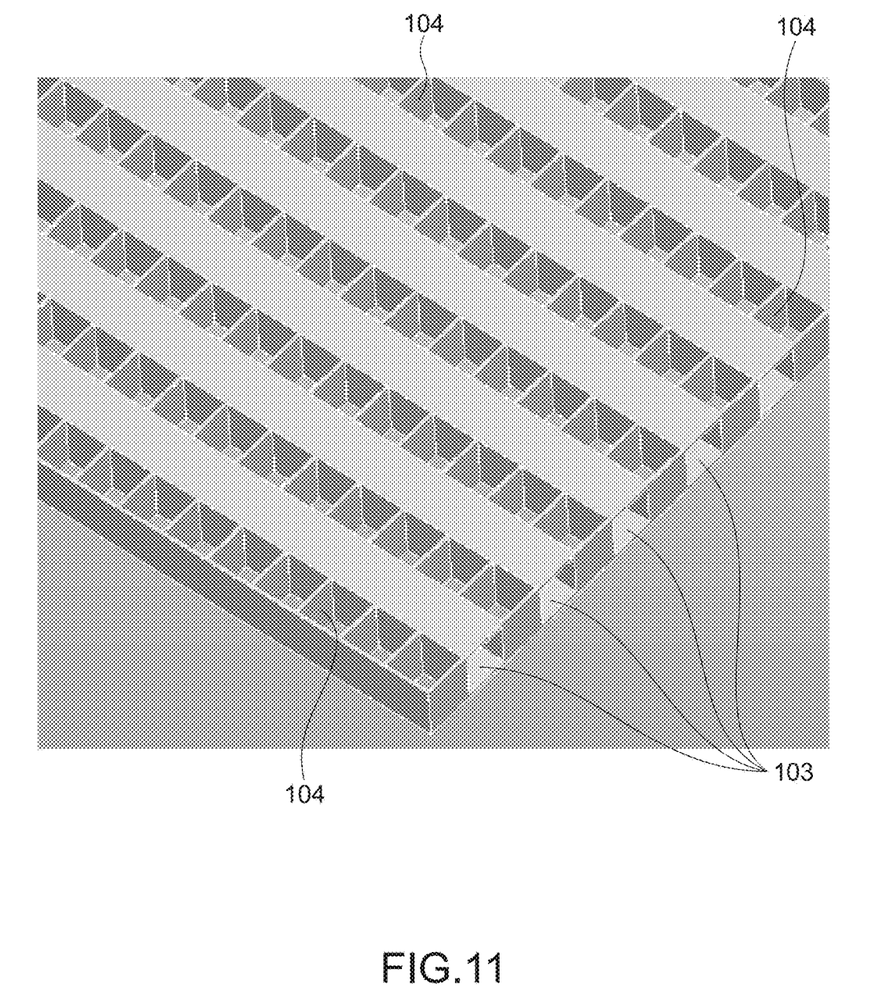
FIG. 11 is a perspective view of a structure according to still another example, which can be formed with the structure forming apparatus.

FIG. 11 is a perspective view of a structure according to still another example, which can be formed with the structure forming apparatuses 400 and 500. This structure can be used as a heat exchange device including a plurality of micro flow paths 103 and a plurality of fins 104 arrayed along a longitudinal direction of these micro flow paths 103.

OTHER EMBODIMENTS

The present application is not limited to the embodiments described hereinabove, and can be carried out in other various embodiments.

In each of the above-mentioned embodiments, surface treatment such as fluorine coating may be performed, for example, on the surface of at least one of the roller 22 and the pipe member 24 (retaining member 60). The same applies to the rollers 222 and 224. With this, the cured object R' output from the slit region can be easily peeled off from the roller 22 and the pipe member 24.

The take-up reel 40 is capable of taking up the cured object R' together with a separator sheet (not shown). Note that, the separator sheet is different from the base film F.

The structure forming apparatuses 400 and 500 according to the embodiment described with reference to FIGS. 5 and 6 are each capable of forming a cured object as a base portion with irradiation with the laser beam LB1 from the first laser light source 111, and this cured object as a base portion can be used instead of the base film F. In this case, on the base portion, a cured layer having an arbitrary shape is formed with the laser beam LB2 from the second laser light source 112.

In the structure forming apparatuses according to the above-mentioned embodiments, although one or two laser light sources are provided, three or more laser light sources may be provided. In this case, three or more (or two) laser beams each having a different optical axis angle may be input from the same one roller (roller 22, for example) side to the slit region. Alternatively, from both sides of the slit region, laser beams at a plurality of optical axis angles may be input to the slit region.

The reflection mechanism 70 for the laser beam and the removal unit 80 may be omitted from the structure forming apparatus 600 illustrated in FIG. 7.

In the reflection mechanism 70 illustrated in FIG. 7, a polarizing plate may be provided at a laser-beam inlet port between the reflecting plates 71 and 72. In this case, the laser beam input to the polarizing plate is converted into a polarized beam, and there may be employed a configuration in which the laser beam input as the polarized beam is not emitted from the inlet port after being transmitted and once input to between the reflecting plates 71 and 72 through the inlet port.

In the above-mentioned embodiments, although being supplied from the material supply unit (not shown), the material to be cured by an energy beam may be manually supplied.

At least two of the features in the embodiments described hereinabove may be combined with each other.

The present application may employ the following configurations.

(1) A structure forming apparatus, including:
a roller provided to be rotatable, having a length in an axial direction of the rotation, and capable of transmitting an energy beam;
a retaining member arranged to face the roller such that a slit region having a length in the axial direction is formed between the retaining member and the roller, and capable of retaining a material to be cured by energy of the energy beam at least in the slit region;
an irradiation unit configured to selectively radiate the energy beam to the slit region through the roller to cure the material so that a sheet-like structure is formed; and
a take-up reel configured to take up the sheet-like structure thus formed.

(2) The structure forming apparatus according to Item (1), further including a supply reel configured to supply a base film to between the roller and the retaining member.

(3) The structure forming apparatus according to Item (2), in which the take-up reel takes up the sheet-like structure formed on the base film together with the base film.

(4) The structure forming apparatus according to any one of Items (1) to (3), in which the irradiation unit includes a first light source configured to generate a laser beam as the energy beam.

(5) The structure forming apparatus according to Item (4), in which the irradiation unit further includes a scanning mechanism configured to scan the laser beam generated from the first light source in the axial direction.

(6) The structure forming apparatus according to Item (4) or (5), in which
the retaining member is made of a material capable of transmitting the laser beam, and
the irradiation unit further includes a second light source configured to irradiate the material retained in the slit region by the retaining member with a laser beam.

(7) The structure forming apparatus according to any one of Items (4) to (6), in which
the material includes a photo-curable resin and contains a light absorber, and
the irradiation unit further includes a control unit configured to control power of the laser beam from the first light source so that a depth of the sheet-like structure formed in the slit region is successively controlled in an optical axis direction of the laser beam from the first light source.

(8) The structure forming apparatus according to any one of Items (1) to (7), further including a supply mechanism configured to supply the material to the slit region.

(9) The structure forming apparatus according to any one of Items (1) to (8), further including a removal unit configured to remove an uncured material adhering to the sheet-like structure output from the slit region.

(10) The structure forming apparatus according to Item (9), in which the removal unit includes a nozzle configured to suck the uncured material by a vacuum action.

(11) The structure forming apparatus according to Item (10), in which
the removal unit further includes a pipe-shaped mesh roller which is formed of a mesh member, provided to be rotatable on a transfer path for the sheet-like structure between the roller and the take-up reel, and applies tension to the sheet-like structure output from the slit region, and
the nozzle is arranged inside the pipe-shaped mesh roller, and sucks the uncured material through intermediation of the mesh member of the pipe-shaped mesh roller.

(12) The structure forming apparatus according to Item (4), in which
the retaining member is made of a material capable of transmitting the laser beam from the first light source,
the structure forming apparatus further including:
a removal unit configured to remove an uncured material adhering to the sheet-like structure output from the slit region; and
a transfer mechanism configured to transfer the sheet-like structure from which the uncured material has been removed by the removal unit up to the take-up reel while the laser beam emitted from the first light source through the retaining member is input to the sheet-like structure from which the uncured material has been removed.

(13) The structure forming apparatus according to Item (12), further comprising one of a reflecting member and a light guide member configured to support input of the laser beam from the first light source to the sheet-like structure to be transferred by the transfer mechanism.

(14) A method of manufacturing a structure, including:
retaining a material to be cured by energy of an energy beam in a slit region which is formed between a roller provided to be rotatable, having a length in an axial direction of the rotation, and capable of transmitting the energy beam, and a retaining member arranged to face the roller, and which has a length in the axial direction;

selectively radiating the energy beam to the slit region through the roller to cure the material so that a sheet-like structure is formed; and taking up the sheet-like structure thus formed with a take-up reel.

(15) A structure manufactured by a method including:

retaining a material to be cured by energy of an energy beam in a slit region which is formed between a roller provided to be rotatable, having a length in an axial direction of the rotation, and capable of transmitting the energy beam, and a retaining member arranged to face the roller, and which has a length in the axial direction;

selectively radiating the energy beam to the slit region through the roller to cure the material so that a sheet-like structure is formed; and taking up the sheet-like structure thus formed with a take-up reel.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An apparatus, comprising:
    a roller configured to be rotatable, wherein the roller has a length in an axial direction of rotation, and wherein the roller is further configured to transmit an energy beam;
    a retaining member configured to:
        face the roller, wherein a region between the retaining member and the roller comprises a slit region that has a length in the axial direction; and
        retain a material to be cured by energy of the energy beam at least in the slit region,
    wherein the energy beam is configured to be selectively radiated to the slit region between the retaining member and the roller, through the roller to cure the material to create a sheet-like structure, and
    wherein the energy beam radiated to the slit region is configured to be transmitted through the retaining member;
    a take-up reel configured to take up the sheet-like structure; and
    a plurality of reflecting members configured to surround the energy beam transmitted through the retaining member after radiation of the transmitted energy beam through the roller.

2. The apparatus according to claim 1, further comprising a supply reel configured to supply a base film between the roller and the retaining member.

3. The apparatus according to claim 2, wherein the take-up reel is further configured to take up the sheet-like structure created on the base film together with the base film.

4. The apparatus according to claim 1, further comprising an irradiation unit configured to generate a laser beam as the energy beam.

5. The apparatus according to claim 4, wherein the irradiation unit comprises a scanning mechanism configured to scan the energy beam generated from a first laser light source in the axial direction.

6. The apparatus according to claim 1, wherein the material comprises a photo-curable resin and contains a light absorber.

7. The apparatus according to claim 1, further comprising a supply mechanism configured to supply the material to the slit region.

8. The apparatus according to claim 1, further comprising a removal unit configured to remove an uncured material that adheres to the sheet-like structure output from the slit region.

9. The apparatus according to claim 8, wherein the removal unit comprises a nozzle configured to suck the uncured material by vacuum action.

10. The apparatus according to claim 9,
    wherein the removal unit further comprises a pipe-shaped mesh roller, wherein the mesh roller comprises a mesh member, wherein the mesh roller is configured to be rotatable on a transfer path for the sheet-like structure between the roller and the take-up reel, and wherein the mesh roller is further configured to apply tension to the sheet-like structure output from the slit region, and
    wherein the nozzle is further configured to be arranged inside the pipe-shaped mesh roller, and wherein the nozzle is further configured to suck the uncured material through intermediation of the mesh member of the pipe-shaped mesh roller.

11. The apparatus according to claim 10, wherein the nozzle is further configured to move along an axial direction of the pipe-shaped mesh roller.

12. The apparatus according to claim 1, wherein the retaining member is made of a material configured to transmit the energy beam emitted from a laser light source,
    wherein the apparatus further comprises:
        a removal unit configured to remove an uncured material that adheres to the sheet-like structure output from the slit region; and
        a transfer mechanism configured to transfer the sheet-like structure from which the uncured material has been removed by the removal unit up to the take-up reel while the energy beam emitted from the laser light source through the retaining member is input to the sheet-like structure from which the uncured material has been removed.

13. The apparatus according to claim 12, wherein the plurality of reflecting members are further configured to support input of the energy beam from the laser light source to the sheet-like structure to be transferred by the transfer mechanism.

14. The apparatus according to claim 1, further comprising an irradiation unit that comprises:
    a lens configured to:
        convert an equiangular motion of the energy beam reflected by a polygonal mirror into a uniform motion; and
        emit the converted energy beam.

15. The apparatus according to claim 14, wherein the polygonal mirror is configured to be rotated so as to scan the energy beam generated from a laser light source along the axial direction of rotation of the roller.

16. The apparatus according to claim 1, further comprising:
    a control unit configured to control power of the energy beam so that a depth of the sheet-like structure created in the slit region is successively controlled in an optical axis direction of the energy beam.

17. The apparatus according to claim 1, wherein the plurality of reflecting members further are configured to be arranged between the retaining member and the take-up reel.

* * * * *